United States Patent
Krittian et al.

(10) Patent No.: US 9,664,168 B2
(45) Date of Patent: May 30, 2017

(54) HYDROSTATIC POWER UNIT

(71) Applicant: Linde Hydraulics Gmbh & Co. KG, Aschaffenburg (DE)

(72) Inventors: Lukas Krittian, Aschaffenburg (DE); Thomas Loeffler, Waldaschaff (DE); Alfred Langen, Aschaffenburg (DE); Rolf Lasaar, Grossostheim (DE)

(73) Assignee: Linde Hydraulics GmbH & Co. KG, Aschaffenburg (DE)

( * ) Notice: Subject to any disclaimer, the term of this patent is extended or adjusted under 35 U.S.C. 154(b) by 256 days.

(21) Appl. No.: 14/451,747

(22) Filed: Aug. 5, 2014

(65) Prior Publication Data
US 2015/0052889 A1    Feb. 26, 2015

(30) Foreign Application Priority Data

Aug. 23, 2013  (DE) .................. 10 2013 109 110
Sep. 17, 2013  (DE) .................. 10 2013 110 239

(51) Int. Cl.
*F02N 7/08* (2006.01)
*F02N 7/00* (2006.01)
(Continued)

(52) U.S. Cl.
CPC .................. *F02N 7/08* (2013.01); *B60K 6/12* (2013.01); *F02B 73/00* (2013.01); *F02N 7/00* (2013.01);
(Continued)

(58) Field of Classification Search
CPC ..... F04B 17/05; B60K 2006/126; B60K 6/12; F02N 7/00; F02N 7/08
See application file for complete search history.

(56) References Cited

U.S. PATENT DOCUMENTS 2,986,872 A * 6/1961 Budzich .................. F02N 7/08
                                                         417/324
3,106,057 A * 10/1963 Manning .................. F02N 7/08
                                                         417/222.1
(Continued)

FOREIGN PATENT DOCUMENTS

DE    2542244 A1    3/1977
DE    3247335 A1    9/1983
EP    2308795 A1    4/2011

*Primary Examiner* — Eric Keasel
*Assistant Examiner* — Michael Quandt
(74) *Attorney, Agent, or Firm* — The Webb Law Firm

(57) ABSTRACT

A hydrostatic power unit (2) comprises a variable displacement machine with a continuously variable displacement volume and is operated as a pump and motor and is in a drive connection with an internal combustion engine (3). When operated as a pump, the power unit sucks hydraulic fluid out of a tank (9) and delivers into a delivery side (P), and, when operated as a motor, functions as a hydraulic starter to start the internal combustion engine (3). When operated as a motor, the power unit is supplied with hydraulic fluid from a hydraulic accumulator (30). The displacement volume of the power unit (2) is set by a displacement volume control device (60) actuated by a positioning piston device (61) supplied with hydraulic fluid from a charging pressure circuit (23). The power unit (2) includes a supplemental positioning piston device (80) in an operative connection with the displacement volume control device (60) and which is actuated directly by the pressure present in the hydraulic accumulator (30). By means of a connection of the supplemental positioning piston device (80) with the hydraulic accumulator, the power unit (2) can be adjusted to increase the displacement volume to start the internal combustion engine (3).

20 Claims, 4 Drawing Sheets

(51) Int. Cl.
| | |
|---|---|
| *F16H 61/42* | (2010.01) |
| *F02B 73/00* | (2006.01) |
| *F02N 9/04* | (2006.01) |
| *F03C 1/00* | (2006.01) |
| *F03C 1/26* | (2006.01) |
| *F04B 13/00* | (2006.01) |
| *F04B 17/05* | (2006.01) |
| *F04B 49/12* | (2006.01) |
| *B60K 6/12* | (2006.01) |
| *F02N 11/08* | (2006.01) |

(52) U.S. Cl.
CPC ............... *F02N 9/04* (2013.01); *F03C 1/005* (2013.01); *F03C 1/26* (2013.01); *F04B 13/00* (2013.01); *F04B 17/05* (2013.01); *F04B 49/12* (2013.01); *F16H 61/42* (2013.01); *B60K 2006/126* (2013.01); *F02N 11/0814* (2013.01); *Y02T 10/6208* (2013.01)

(56) References Cited

U.S. PATENT DOCUMENTS 3,234,889 A * 2/1966 Cooper .................. F16H 61/46
　　　　　　　　　　　　　　　　　　　　　60/629
3,252,426 A * 5/1966 Parr ......................... F02N 7/08
　　　　　　　　　　　　　　　　　　　　　417/222.1

* cited by examiner

HYDROSTATIC POWER UNIT

CROSS REFERENCE TO RELATED APPLICATIONS

This application claims priority to German Application No. 102013109110.5 filed Aug. 22, 2013, and German Application No. 102013110239.5 filed Sep. 17, 2013, which are herein incorporated by reference in their entirety.

BACKGROUND OF THE INVENTION

Field of the Invention

This invention relates to a hydrostatic power unit in the form of a variable displacement machine with a variable, in particular a continuously variable, displacement volume and which can be operated as a pump and as a motor and is in a drive connection with an internal combustion engine. When the power unit is operated as a pump, it sucks hydraulic fluid on a suction side from a tank and delivers into a delivery side. When the power unit is operated as a motor, it is a hydraulic starter to start the internal combustion engine. When the power unit is operated as a motor, hydraulic fluid from a hydraulic accumulator is supplied to the suction side of the power unit. The displacement volume of the power unit can be varied by a displacement volume control device that can be actuated with a positioning piston device.

Description of Related Art

Hydrostatic power units which, when operated as a pump in which the power unit is driven by the running internal combustion engine, are used to charge a hydraulic accumulator and/or to supply at least one user with hydraulic fluid. When operated as a motor, the power unit is used as a hydraulic starter to start the shutoff internal combustion engine. Such power units are used in vehicles such as automobiles, trucks, or buses, and in mobile machines or construction equipment such as industrial trucks, agricultural equipment, forestry equipment, excavators, wheel loaders and telescoping loaders, tractors, combine harvesters, forage harvesters, and sugar beet or potato diggers.

To reduce fuel consumption when the internal combustion motor is running at idle, for example during waiting times, pauses or interruptions in work, a start-stop function is provided for the internal combustion engine. The internal combustion engine, which is running at no load, is shut off during pauses or interruptions in the work and is automatically restarted when torque is requested by a work function or by the traction drive. A rugged and reliable start-stop function of the internal combustion engine can be achieved with a hydraulic starter.

EP 2 308 795 A1 describes a hydrostatic power unit which, when operated as a pump in which the power unit is driven by an internal combustion engine and sucks hydraulic fluid with a suction side out of the tank, is used to supply a user of the working hydraulics with hydraulic fluid and functions by means of a charging circuit to charge a hydraulic accumulator. When operated as a motor, hydraulic fluid under pressure is delivered to the suction side of the power unit from the hydraulic accumulator and the power unit is driven by the hydraulic fluid from the hydraulic accumulator. The power unit operated as a motor generates an additional torque on the crankshaft of the internal combustion engine. The power unit operated as a motor can consequently be used as a hydraulic starter to start the shutoff internal combustion engine and/or as a booster drive to boost the running internal combustion engine.

If the power unit is a variable displacement machine with a continuously variable displacement volume, in operating the power unit as a motor for use as a hydraulic starter, the displacement volume control device of the power unit must be adjusted for startup of the shutoff internal combustion engine to increase the displacement, for example to a position with the maximum displacement, so that when the power unit is operated as a motor, the hydraulic fluid delivered from the hydraulic accumulator to the suction side of the power unit can generate a torque sufficient to start the internal combustion engine. Hydrostatic displacement machines, particularly variable displacement machines that are operated as pumps in an open circuit, are generally actuated by a spring device toward a minimum displacement volume so that the lowest possible drag torque is generated during a normal startup of the internal combustion engine by an electric starter.

On a variable displacement machine with a variable displacement volume, the displacement volume can be set (adjusted) by a displacement volume control device actuated by an actuator and control valve. The actuator and control valve is connected to a charging pressure circuit for the supply of hydraulic fluid. When the internal combustion engine is shut off, however, there is no charge pressure or volume flow available in the charging pressure circuit.

For adjusting of the power unit to start the internal combustion engine when the internal combustion engine is shut off, it is known from EP 2 308 795 A1 (FIG. 2) that a variable displacement device that controls the displacement volume of the power unit can be connected with the hydraulic accumulator so that when the internal combustion engine is shut off, the displacement volume control device of the power unit can be actuated starting from the position with minimum displacement volume and proceeding toward an increase of the displacement volume with the hydraulic fluid from the hydraulic accumulator to stroke the power unit for starting the internal combustion engine. The hydraulic accumulator is in communication via a pressure reducing valve with a charging pressure circuit which, when the internal combustion engine is running, supplies the variable displacement volume control device of the power unit with hydraulic fluid. With the pressure reducing valve, the pressure present in the hydraulic accumulator is reduced to the charge pressure level of the charging pressure circuit to adjust the displacement volume control device when the internal combustion engine is shut off.

The actuator and control valve of the displacement volume control device described in EP 2 308 795 A1 is designed for the charge pressure level of the charging pressure circuit in the low-pressure range of approximately 20 to 30 bar. In the charged hydraulic accumulator, however, there are pressures in the medium pressure and high pressure range of at least 100 bar. To be able to adjust the displacement volume of the power unit when the internal combustion is shut off with the hydraulic fluid from the hydraulic accumulator, an additional pressure reducing valve is therefore necessary to reduce the pressure level present in the hydraulic accumulator to the level of the charging pressure circuit for the supply of the actuator and control system of the power unit. However, a pressure reducing valve entails additional costs and takes up a good deal of space on account of its space-intensive construction.

If additional users other than the control and actuation system of the variable displacement machine to adjust the displacement volume control device when the internal combustion engine is shut off for a startup of the shutoff internal combustion engine, are to be supplied from the charging pressure circuit, a shutoff valve, such as a check valve, that cuts off the flow to the charging pressure circuit is required to prevent a discharge or outflow of the charging pressure to the other users of the charging pressure circuit and the tank generated from the hydraulic accumulator via the pressure reducing valve.

On account of the design of the actuator and control valve for the charge pressure level of the charging pressure circuit and, thus, the low-pressure level, a positioning piston device which is in an operative connection with the displacement volume control device for its actuation and control has a large pressurized piston surface to be able to generate the forces necessary for the actuation and control of the displacement volume control device Thus, there are large-volume positioning piston pressure chambers on the positioning piston device. To adjust the displacement volume control device of the power unit to the maximum displacement volume to start the shutoff internal combustion engine when the power unit is operated as a motor, relatively large quantities of hydraulic fluid are necessary, which are taken from the hydraulic accumulator to set the power unit to start the shutoff internal combustion engine. Because of this quantity of hydraulic fluid extracted from the hydraulic accumulator for the adjustment of the power unit, the pressure present in the hydraulic accumulator decreases so that the torque that can be delivered during operation of the power unit as a motor for the starting of the internal combustion engine, which is a function of the pressure present in the hydraulic accumulator, is reduced.

A further disadvantage of supplying the actuator and control valve by a pressure reducing valve from the pressure in the hydraulic accumulator is that the actuation time for the adjustment of the displacement volume of the power unit is directly proportional to the quantity of hydraulic fluid required by the positioning piston device and the hydraulic fluid volume flow from the hydraulic accumulator to the positioning piston pressure chamber of the positioning piston device. On account of the actuator and control valve and the positioning piston device designed for the charge pressure level, a corresponding amount of time is required during which, with the internal combustion engine shut off, the power unit is set to the maximum displacement volume, before the operation of the power unit as a motor can generate a torque sufficient to start the shutoff internal combustion engine, as a result of which the startup of the internal combustion is correspondingly delayed by the operation of the power unit as a motor, which can be subjectively unpleasant for a driver of the vehicle.

An object of the invention is to provide a hydrostatic power unit of the general type described above but which, with little added construction effort or expense, makes it possible to start the internal combustion engine with the power unit operating as a motor in a short period of time.

SUMMARY OF THE INVENTION

The invention accomplishes this object in that a supplemental positioning piston device is provided which is in an operative connection with the displacement volume control device for control of the displacement volume of the power unit, and which can be pressurized directly by the pressure present in the hydraulic accumulator. The power unit can be adjusted toward an increase in the displacement volume to start the internal combustion engine by a connection of the supplemental positioning piston device with the hydraulic accumulator. The invention, therefore, teaches that, in addition to the actuator and control device and positioning piston device supplied with pressure and hydraulic fluid from the charging pressure circuit, a supplemental positioning piston device is provided, with which the displacement volume of the power unit can be adjusted when the internal combustion engine is shut off, and which is pressurized directly at the increased pressure level and with the pressure from the hydraulic accumulator. Because the supplemental positioning piston device is pressurized directly with the pressure of the hydraulic accumulator, no additional pressure reducing valve is necessary to reduce the pressure in the hydraulic accumulator to the charge pressure level and no additional shutoff valve to prevent an outflow or discharge of the charge pressure generated from the hydraulic accumulator via the pressure-reducing valve into the charging pressure circuit, which means that large and expensive valves can be eliminated. The power unit of the invention, with the supplemental positioning piston device, therefore makes possible, with little added effort or expense and requiring only a little additional space for installation of the components, an adjustment of the power unit when the internal combustion engine is shut off for the startup of the internal combustion engine by operating the power unit as a motor.

It is particularly advantageous if, as in one embodiment of the invention, a pressurized piston surface of the supplemental positioning piston device is smaller than a pressurized piston surface of the positioning piston device. The supplemental piston device pressurized directly with the pressure from the hydraulic accumulator works at a pressure level which is a multiple of that of the positioning piston device supplied with pressure and hydraulic fluid at the charging pressure circuit. In contrast to the positioning piston device pressurized at the low-pressure level from the charging pressure circuit, the supplemental positioning piston device is pressurized at the medium pressure level or high pressure level of the hydraulic accumulator. The pressurized piston surface and, thus, the diameter of the supplemental positioning piston device can be smaller than the pressurized piston surface and the diameter of the positioning piston device. On account of the small pressurized piston surface, the supplemental positioning piston device therefore requires only little extra construction effort and expense. As a result of the smaller pressurized piston surface of the supplemental positioning piston device, the amount of hydraulic fluid that must be extracted from the hydraulic accumulator for the adjustment of the power unit when the internal combustion engine is shut off can be further reduced so that the pressure in the hydraulic accumulator is further slightly reduced. The residual pressure in the hydraulic accumulator thus results in a high torque that can be delivered when the power unit is operated as a motor, which makes an effective startup of the internal combustion engine possible. The smaller quantity of hydraulic fluid required on account of the smaller pressurized piston surface of the supplemental positioning piston device for the variation of the displacement volume of the power unit also results in a shorter actuation time of the power unit when the internal combustion engine is shut off, thereby making possible a more rapid startup of the internal combustion engine when the power unit is operated as a motor.

In one advantageous embodiment of the invention, the power unit is a unilaterally variable power unit, and the displacement volume control device of the power unit can be adjusted in one actuation direction by the positioning piston device and the supplemental positioning piston device, starting from a position with a minimum displacement volume. Unilaterally variable power units are operated in an open circuit, and with little added construction effort and expense and with low energy consumption when operated as a pump, make it possible to charge the hydraulic accumulator and/or to supply the connected users with hydraulic fluid. With the supplemental positioning piston device of the invention which, like the positioning piston device already present, adjusts the displacement volume of the power unit toward the maximum displacement volume, a power unit of this type configured as a unilaterally variable pump can be easily set to the maximum displacement volume when the internal combustion engine is shut off and, when operated as a motor in which case the power unit is driven on the suction side with hydraulic fluid from the hydraulic fluid reservoir, to start the shutoff internal combustion engine.

It is particularly advantageous if, as in one development of the invention, the supplemental positioning piston device, when in communication with the hydraulic accumulator, sets the displacement volume control device at a terminal stop with the maximum displacement volume. The supplemental positioning piston device can be moved without the requirement for any control or regulation device toward a terminal stop, which results in a simple and economical design of the supplemental positioning piston device, as well as a simple and economical actuation of the supplemental positioning position device for the startup of the shutoff internal combustion engine.

It is particularly advantageous if a control valve is provided to control the connection of the hydraulic accumulator with the suction side of the power unit. The control valve simultaneously controls the communication of the supplemental positioning piston device with the hydraulic accumulator. The connection of the hydraulic accumulator with the suction side of the power unit can advantageously be controlled by an electrically actuated control valve. With an electrically actuated control valve, the operation of the power unit as a motor during a startup of the shutoff internal combustion engine can be controlled in a simple manner. If the control valve also controls the pressurization of the supplemental positioning piston device with the pressure from the hydraulic accumulator, it becomes possible in a simple manner to adjust the power unit via the supplemental positioning piston device to the maximum displacement volume for startup of the internal combustion engine by operating the power unit as a motor.

For startup of the shutoff internal combustion engine by operating the power unit as a motor, the suction side of the power unit is advantageously connected by the control valve with the hydraulic accumulator and the supplemental positioning piston device is placed in communication with the hydraulic accumulator. The control valve, which for startup of the shutoff internal combustion engine by the power unit operating as a motor, connects the suction side of the power unit with the hydraulic accumulator, therefore simultaneously switches the pressure of the hydraulic accumulator to the supplemental positioning piston device. This configuration results in a simple control of the startup of the shutoff internal combustion engine because only the control valve must be actuated accordingly to connect the suction side of the power unit with the hydraulic accumulator and the supplemental positioning piston device with the hydraulic accumulator. The internal combustion engine starts up automatically as soon as the torque generated from the pressure of the hydraulic accumulator and the position of the displacement volume control device set by the supplemental position and generated when the power unit is operated as a motor exceeds the drag and initial breakaway torques on the crankshaft of the internal combustion engine.

In one preferred embodiment of the invention, the hydraulic accumulator is in communication with the suction side of the power unit by a connecting line in which the control valve is located. For pressurization of the supplemental positioning piston device with hydraulic fluid from the hydraulic accumulator, a hydraulic line is provided which is connected with the connecting line downstream of the control valve. The supplemental positioning piston device is connected to the connecting line between the control valve and the suction side of the power unit. It consequently becomes possible to connect the hydraulic accumulator with the suction side of the power unit and the supplemental positioning piston device in a control position of the control valve in which the connecting line is opened for a startup of the shutoff internal combustion engine.

It is particularly advantageous if, in the hydraulic fluid line that leads to the supplemental positioning piston device, there are throttling means, in particular a nozzle or a throttle, that influence the speed of response (actuating velocity) of the displacement volume control device. The speed of response of the displacement volume control device can be controlled and limited, for example to prevent damage to the terminal stop and to the displacement volume control device interacting with the terminal stop.

The supplemental positioning piston device can be installed in any desired position on the actuator and control valve of the pump, which is already present and is supplied with hydraulic fluid by the charging pressure circuit. The supplemental positioning piston device is advantageously in an operative connection with the positioning piston device, which is in an operative connection with the displacement volume control device, or with the displacement volume control device, or with a component of an actuator and control valve that connects the positioning piston device with the displacement volume control device. The supplemental positioning piston device can be installed and added in a suitable location of the actuator and control valve which is already present.

In one advantageous embodiment of the invention, the supplemental positioning piston device is located in an axial extension of the positioning piston device and is operatively connected with the positioning piston device. This arrangement has advantages in terms of a simple and space-saving installation of the supplemental positioning piston device.

In one advantageous embodiment of the invention, the supplemental positioning piston device can be non-detachably connected with the positioning piston device or with the displacement volume control device or with the component of the actuator and control valve by means of interlocking connecting means. This arrangement achieves in a simple manner a coupling of the supplemental positioning piston device with the component of the actuator and control valve that is in an operative connection with the supplemental positioning piston device and is moved by the supplemental positioning piston device and, in the event of a pressurization of the supplemental positioning piston device, prevents the supplemental positioning piston device from striking the component of the actuator and control device that is moved by the supplemental positioning piston device and is in an operative connection with the supplemental positioning piston device.

The interlocking connecting means are preferably an articulated joint, in particular a ball-and-socket joint, a pivot, or a hinge.

In an alternative embodiment, the supplemental positioning piston device is detachably connected to the positioning piston device or to the displacement volume control device or to the component of the actuator and control valve. With a connection of this type, the cost and effort required for construction can be reduced because no interlocking connecting means are necessary to couple the supplemental positioning piston device, and the component of the actuator and control valve that is operatively connected to the supplemental positioning piston device and must be moved by the supplemental positioning piston device.

When a supplemental positioning piston device is in detachable contact with the component to be moved, to prevent the supplemental positioning piston device from impacting the component of the actuator and control valve that is in operative contact with the supplemental positioning piston device and must be moved by the supplemental positioning piston device, the supplemental positioning piston device is advantageously actuated by a spring device, in particular a compression spring, which holds the supplemental positioning piston device in contact against the positioning piston device or the displacement volume control device or the component of the actuator and control valve.

In one advantageous embodiment of the invention, the displacement volume control device is actuated by a spring device toward a minimum displacement volume. When the internal combustion engine is running and the hydraulic accumulator is charged, and the other users are not actuated, it is therefore possible in a simple manner to ensure that the power unit, when operated as a pump, is in the position with minimum displacement volume, preferably a position with a displacement volume of zero, and causes low losses.

The power unit is preferably an axial piston machine that employs a swashplate construction.

The invention further relates to a drive train of a vehicle, in particular of a mobile machine, with a hydrostatic power unit of the invention driven by an internal combustion engine. When the power unit is operated as a motor, it forms a hydraulic starter of a start-stop function of the internal combustion engine. When it is operated as a pump, it makes it possible to charge the hydraulic accumulator. With the hydrostatic power unit of the invention, an effective and rapid startup of the shutoff internal combustion engine can be achieved when the power unit is operated as a motor.

It is advantageous if the power unit, when operated as a motor, also functions as a hydraulic booster drive. When the power unit is operated as a motor, an additional torque can be introduced into the drive train, which makes possible a short-term operation of the vehicle when the internal combustion engine is shut off or assists the running internal combustion engine, which saves energy.

If the drive train and the vehicle have a system of working hydraulics, it is particularly advantageous if the power unit, when operated as a pump, supplies the working hydraulics system of the vehicle with hydraulic fluid. Therefore, the power unit of the invention, when operated as a pump, functions to supply the working hydraulics of the vehicle and to charge the hydraulic accumulator and, when operated as a motor, functions as a hydraulic starter of a start-stop function and, optionally, also as a booster drive for the running internal combustion engine.

The invention further relates to a vehicle with a drive train of the invention and a hydrostatic power unit of the invention.

BRIEF DESCRIPTION OF THE DRAWINGS

Additional advantages and details of the invention are explained in greater detail below with reference to the exemplary embodiments illustrated in the accompanying schematic figures, in which like reference numbers identify like parts throughout.

DESCRIPTION OF THE PREFERRED EMBODIMENTS

Figure 1:
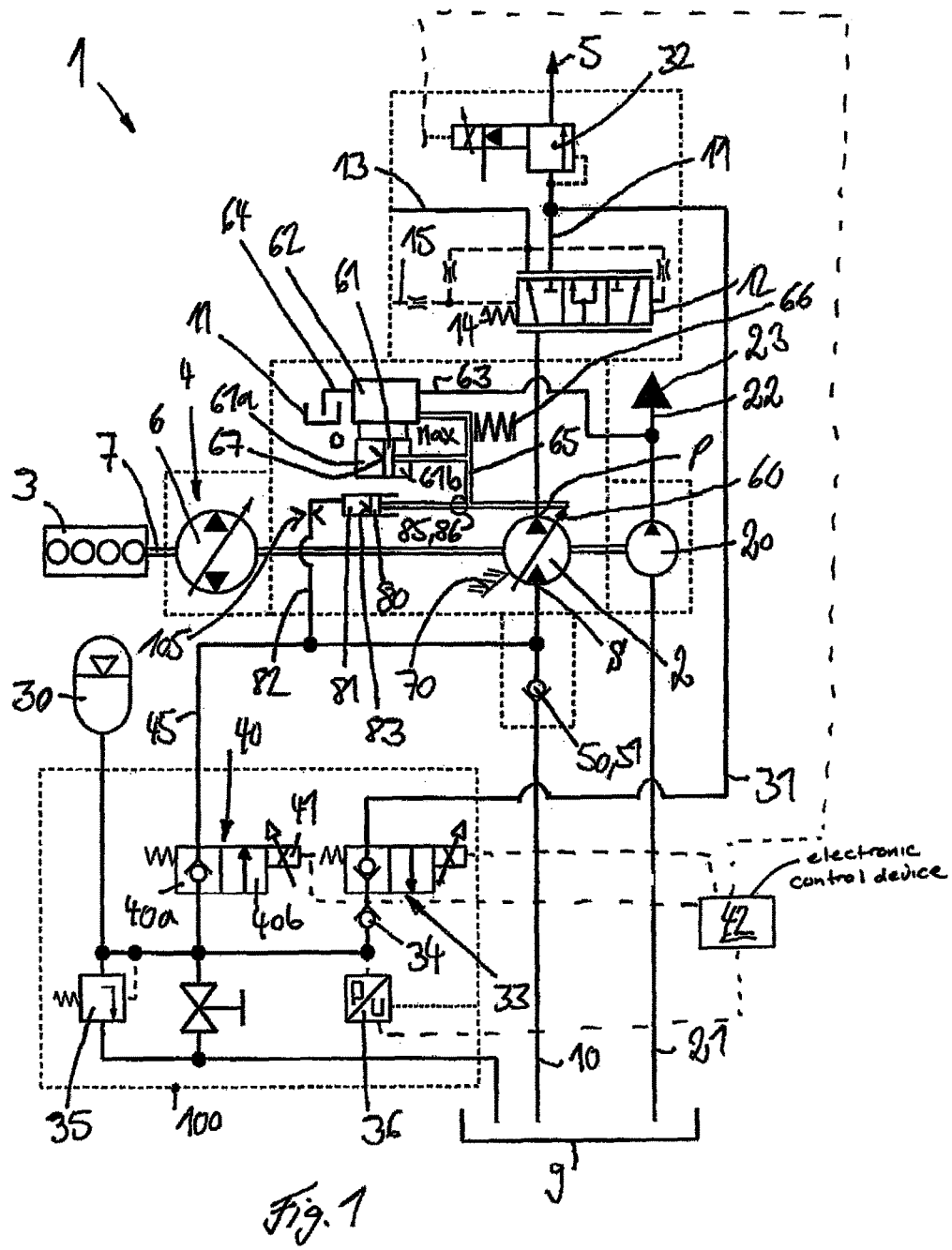
FIG. 1 shows a first embodiment of the invention.
Figure 2:
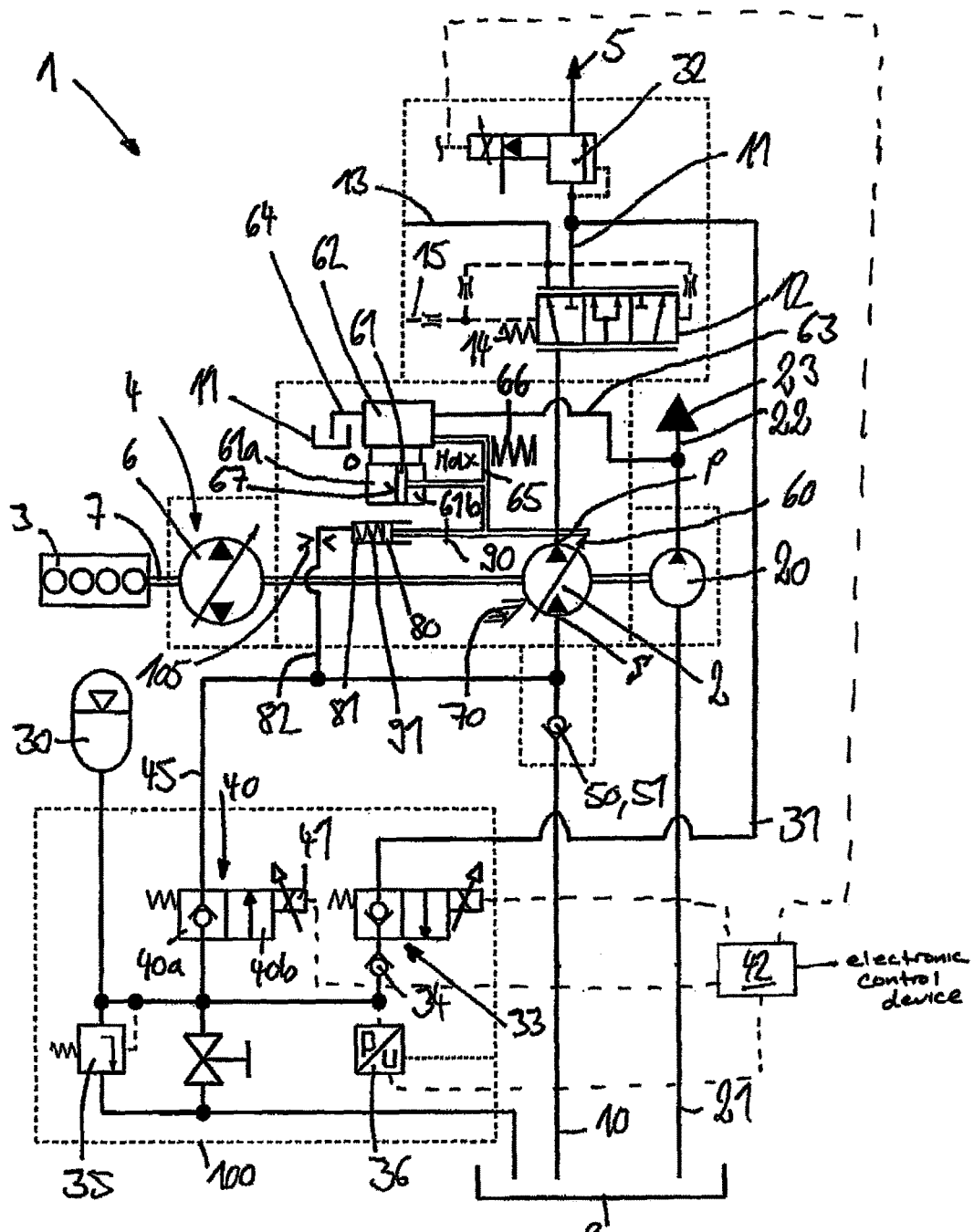
FIG. 2 shows a second embodiment of the invention.
Figure 3:
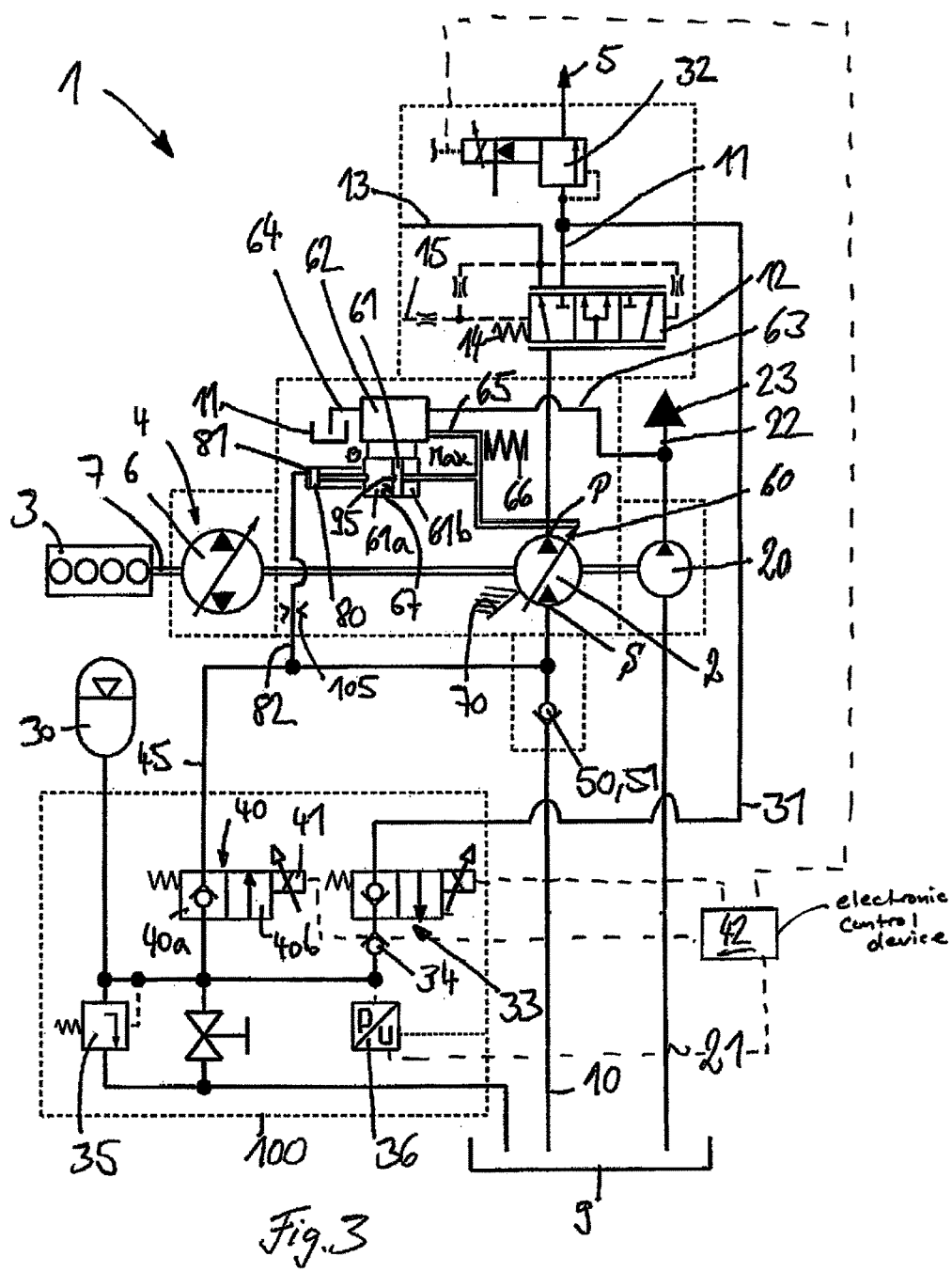
FIG. 3 shows a third embodiment of the invention.
Figure 4:
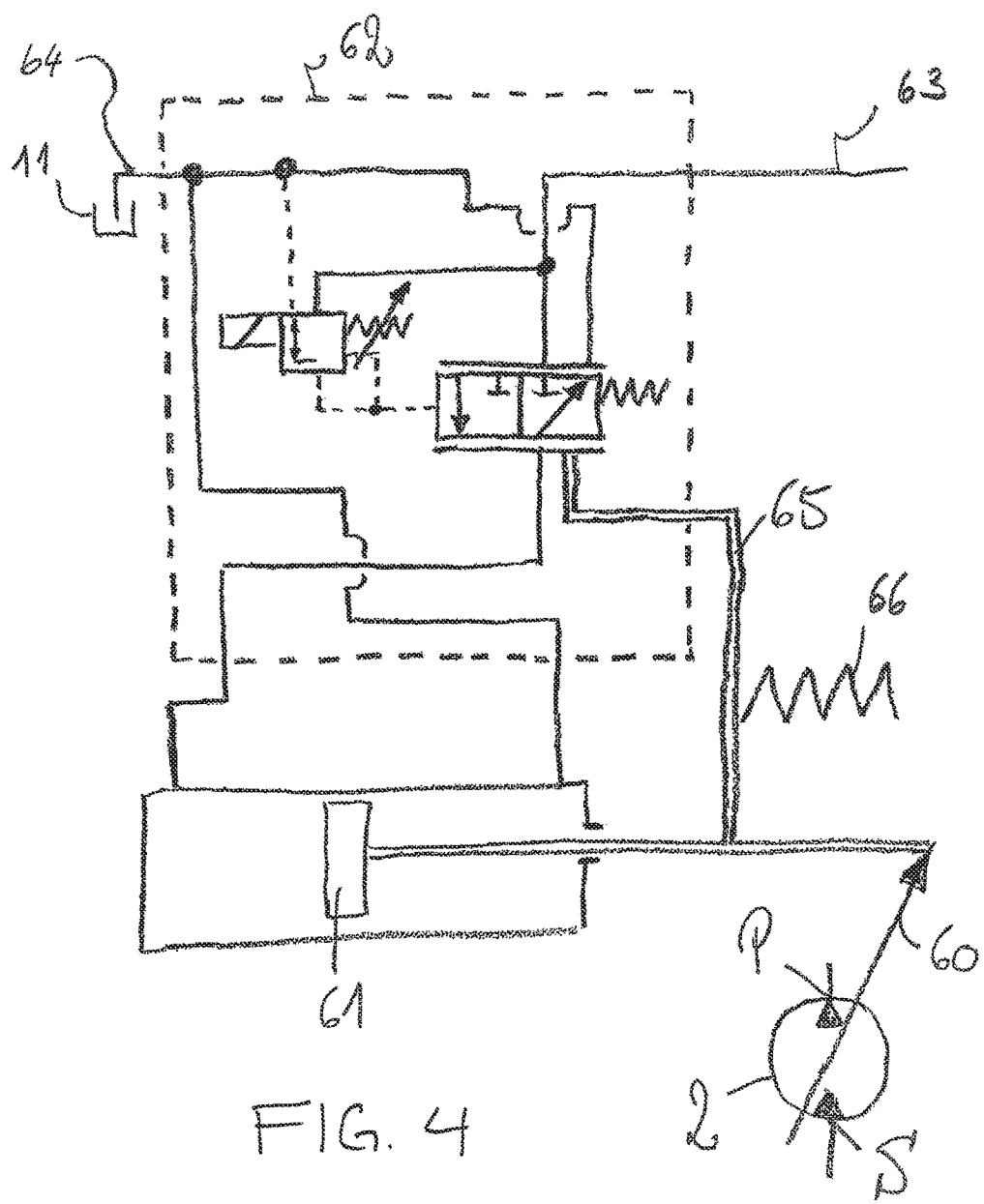
FIG. 4 is a schematic illustration of a positioning valve device according to one embodiment of the invention.

FIGS. 1-3 show a schematic illustration of a drivetrain 1 of a mobile machine (not illustrated in detail), such as an industrial truck or a piece of construction or agricultural equipment, with a hydrostatic power unit 2 of the invention. The drivetrain 1 includes an internal combustion engine 3, such as a diesel engine, a traction drive 4 driven by the internal combustion engine 3, and the hydrostatic power unit 2 in a drive connection with the internal combustion engine 3. The power unit 2 is a variable displacement machine with a continuously variable displacement volume.

The illustrated vehicle is also provided with working hydraulics 5 driven by the internal combustion engine 3.

In the illustrated exemplary embodiment, the traction drive 4 is a hydrostatic traction drive having a variable displacement drive pump 6 driven by a drive connection with an output shaft 7 of the internal combustion engine 3. The drive pump 6 is in communication with one or more constant-displacement or variable-displacement hydraulic motors (not illustrated in any detail), preferably in a closed circuit, and which are in an operative connection with the driven wheels of the machine in a conventional manner.

The traction drive 4 can alternatively be an electric traction drive with an electric generator driven by the internal combustion engine 3 and one or more electric drive motors. The traction drive 4 can also be a mechanical traction drive with a mechanical transmission, such as a multi-speed transmission or a power-split transmission or a torque converter gear train.

The working hydraulics 5 comprise hydraulic functions or work functions of the machine. On an industrial truck, for example, the working hydraulics 5 can be for the actuation of load handling means on a lifting mast. On a piece of construction equipment in the form of an excavator, the working hydraulics 5 can be for working equipment in the form of a shovel.

To supply the working hydraulics 5 with hydraulic fluid, the hydrostatic power unit 2 can be a variable displacement machine with a continuously variable displacement volume, such as an axial piston machine employing a swashplate construction. The power unit 2 is operated in an open circuit and is driven by a drive connection with an output shaft 7 of the internal combustion engine 3.

A suction side S of the power unit 2 is in communication with a tank 9 by an intake line 10. A delivery line 11 is in communication on the output side with a delivery side P of the power unit 2 and is connected to a control valve (device not illustrated in detail), by means of which the hydraulic users of the working hydraulics 5 can be controlled. The control valve device preferably comprises one or more directional control valves for actuation of the users. In the illustrated exemplary embodiment, a priority valve 12 is also shown, by means of which the priority supply of a user supplied by the power unit 2, such as a hydraulic steering device, can be ensured. The priority valve 12 is in communication on the input side with the delivery side P of the power unit 2 and is in communication on the output side with the delivery line 11 that leads to the working hydraulics 5, as well as a delivery line 13 that leads to the steering device. The priority valve 12 is controlled by a spring 14 and by the load pressure of the steering device present in a load pressure line 15.

The drivetrain 1 further comprises a charge pump 20 driven by a connection with the output shaft 7. In the illustrated exemplary embodiment, the charge pump 20 is a constant displacement pump with a constant displacement volume operated in an open circuit. The charge pump 20 is in communication on the suction side with the tank 9 by means of an intake line 21 and delivers into a charging pressure line 22 connected to the delivery side of the charge pump 20, to which the corresponding users of a charging pressure circuit 23 are connected, such as control devices for the control of the displacement volume of the drive pump 6 and of the power unit 2, a supply device of the hydrostatic traction drive, a brake system of the vehicle and pilot valves for the control valves of the working hydraulics 5. When the internal combustion engine 3 is running, the charge pump 20 generates a constant charging pressure in the charging pressure circuit 23. To protect the charging pressure in the charging pressure circuit 23, a pressure limiting device, such as a pressure limiting valve, is associated with the charging pressure line 22.

The power unit 2 of the invention is a two-quadrant power unit which can be operated as a pump and a motor in the same direction of operation and the same direction of flow of the hydraulic fluid.

When it is operated as a pump, in which case the power unit 2 is driven by the running internal combustion engine 3, the power unit 2 sucks in hydraulic fluid from the tank 9 via the suction side S of the power unit 2 and delivers the hydraulic fluid into the delivery side P, and, thus, via the priority valve 12 into the delivery line 11 of the working hydraulics 5 or the delivery line 13 of the steering device.

When the power unit 2 is operated as a motor, in which the power unit 2 functions as the hydraulic starter of a start-stop function to start the shutoff internal combustion engine 3, the power unit 2 is driven on the suction side S with hydraulic fluid from a hydraulic accumulator 30.

For charging with hydraulic fluid, the hydraulic accumulator 30 is connected to the delivery side P of the power unit 2. In the illustrated exemplary embodiment, for the charging of the hydraulic accumulator 30, the hydraulic accumulator 30 is connected to the delivery line 11 of the power unit 2 that leads to the working hydraulics system 5 by means of a connecting line 31.

Located in the delivery line 11 is an electrically actuated charging valve 32 which, when it is actuated, can be actuated into a throttling position in which it throttles the delivery line 11 to build up a pressure. The charging valve 32 is preferably a retarder valve which, during braking of the vehicle, is actuated into a throttling position so that by building up pressure in the delivery line 11 an additional decelerating torque can be impressed on the output shaft 7 formed by the crankshaft, which counteracts the torque generated by the motor on the drive pump 6 and, thus, decelerates the vehicle. In braking operation of this type with a throttling retarder valve, it is also possible in a simple manner to recover the braking energy and to charge the hydraulic accumulator 30, so that the kinetic energy of the vehicle during a braking process is used to charge the hydraulic accumulator 30. The connecting line 31 is connected to the delivery line 11 upstream of the charging valve 32 and, therefore, between the charging valve 32 and the priority valve 12.

Alternatively, for charging of the hydraulic accumulator 30, the power unit 2 functioning as a pump can be driven on the input side by the running internal combustion engine 3.

Located in the connecting line 31 is a shutoff valve 33, which in the illustrated example is a check valve 34 that opens to allow flow to the hydraulic accumulator 30. Also associated with the connecting line 31 between the shutoff valve 33 and the hydraulic accumulator 30 is a pressure limiting valve 35 to control the pressure in the hydraulic accumulator 30.

Also associated with the hydraulic accumulator 30 is a pressure sensor 36. The pressure sensor 36 monitors the charging pressure and, thus, the charge status of the hydraulic accumulator 30.

The connection of the hydraulic accumulator 30 with the suction side S of the power unit 2 for operation of the power unit 2 as a motor can be controlled by an electrically actuated control valve 40. The control valve 40 has a closed position 40a and an open position 40b. The closed position 40a is preferably leak-tight with a shutoff valve that shuts off the flow to the power unit 2. The control valve 40 is an electrically actuatable control valve, preferably a switching valve, which can be actuated by an electrical actuator device 41, such as a switching magnet, between the closed position 40a and the open position 40b.

The actuator device 41 is in communication for its actuation with an electronic control device 42. The control device 42 is further in communication with the pressure sensor 36. The electronic control device 42 is further in communication with a speed sensor device (not illustrated in detail) and measures the speed of rotation of the internal combustion engine 3. The control device 42 can also actuate the charging valve 32 and the shutoff valve 33 for charging the hydraulic accumulator 30.

The control valve 40 is located in a connecting line 45 that runs from the hydraulic accumulator 30 to the intake line 10 that runs to the suction side S of the power unit 2. The connecting line 31 equipped with the shutoff valve 33 is connected to the connecting line 45 between the control valve 40 and the hydraulic accumulator 30.

Located in the intake line 10 of the power unit 2 is a shutoff valve 50 that shuts off the flow to the tank 9 and is preferably a check valve 51. In motor operation, the shutoff valve 50 prevents a discharge of the hydraulic fluid flowing from the hydraulic accumulator 30 to the suction side S of the power unit 2 into the tank 9 and makes possible a pressure increase on the suction side S of the power unit 2 for operation as a motor.

The power unit 2 (a variable displacement machine with a continuously variable displacement volume) has a displacement volume control device 60 to set the displacement volume, for example a swashplate with a variable inclination of an axial piston machine that employs the swashplate construction. The displacement volume control device 60 comprises, for its actuation, an actuator and control valve which is in an operative connection with the displacement volume control device 60 and comprises a positioning piston device 61 in an operative connection with the displacement volume control device 60.

The power unit 2 is a unilaterally variable displacement power unit, in which the displacement volume control device 60, starting from a position with a minimum displacement volume (preferably a position with a displacement volume of zero) can be displaced in one control direction or swiveling direction into a position with a maximum displacement volume. FIG. 1 shows a terminal stop 70 for the maximum displacement volume of the displacement volume control device 60. The positioning piston device 61 has a control pressure compartment 61a that acts in the direction of the maximum displacement volume, and a control pressure compartment 61b that acts in the direction of the minimum displacement volume.

The displacement volume control device 60 can be controlled by a positioning valve device 62 which is also a component of the actuator and control valve. The positioning valve device 62 has a control valve with which the pressurization of the control pressure compartments 61a, 61b of the positioning piston device 61 with an actuation pressure or their depressurization to the tank 9 can be controlled.

The positioning valve device 62, for supply of hydraulic fluid and for the generation of an actuation pressure in the control pressure compartments 61a and 61b of the positioning piston device 61 is in communication with the charging pressure line 22 and, thus, the charging pressure circuit 23 by means of a control pressure line 63. The positioning valve device 62 also has a connection to a tank line 64 that leads to the tank 9. In the illustrated exemplary embodiment, the positioning valve device 62 comprises a high-response proportional valve. There is a mechanical feedback 65 of the actual position of the displacement volume control device 60 on the positioning valve device 62.

A spring device 66, such as, a compression spring, is also provided which actuates the displacement volume control device 60 toward the minimum displacement volume, and which can be limited by a corresponding stop (not illustrated in detail) on the displacement volume control device 60.

The positioning piston device 61 can be supplied with hydraulic fluid from the charging pressure circuit 23 at the charge pressure level of the charging pressure circuit 23. The charge pressure level corresponds to a low-pressure level in the range of 20 to 30 bar.

A supplemental positioning piston device 80 is provided to actuate the displacement volume control device 60 toward the position with maximum displacement volume during a startup of the start-stop function of the shutoff internal combustion engine 3 by operating the power unit 2 as a motor. The supplemental positioning piston device 80 is also in an operative connection with the displacement volume control device 60 for adjustment of the displacement volume of the power unit 2. The supplemental positioning piston device 80 can be pressurized immediately by the pressure present in the hydraulic accumulator 30. In the hydraulic accumulator 30, when charged, a medium pressure level or a high pressure level of at least 100 bar is present.

The supplemental positioning piston device 80 is a unilaterally acting positioning piston and has a control pressure compartment 81 that acts in the direction of the maximum displacement volume.

The control valve 40 is provided to control the connection of the control pressure compartment 81 of the supplemental positioning piston device 80 with the hydraulic accumulator 30 and, thus, to pressurize the control pressure compartment 81 of the supplemental positioning piston device 80 with the pressure of the hydraulic accumulator 30.

A hydraulic line 82 is provided which is in communication with the control pressure compartment 81 of the supplemental positioning piston device 80 and is connected to the connecting line 45, which runs from the hydraulic accumulator 30 to the suction side S of the power unit 2, downstream of the control valve 40.

The direct pressurization of the supplemental positioning piston device 80 with the pressure of the hydraulic accumulator 30 makes it possible to reduce the size of a pressurized piston surface 83 of the supplemental positioning piston device 80 compared to a piston surface 67 of the positioning piston device 61 which is pressurized by the charging pressure level to generate the forces necessary for the adjustment of the displacement volume control device 60.

In the exemplary embodiment illustrated in FIG. 1, the supplemental positioning piston device 80 is in an operative connection with the displacement volume control device 60.

The supplemental positioning piston device 80 is connected with the displacement volume control device 60 by interlocking connecting means 85.

The interlocking connecting means 85 are in the form of an articulated connection 86, such as a ball-and-socket joint or a pivot, located between an extensible piston rod of the supplemental positioning piston device 80 and the displacement volume control device 60.

FIGS. 2 and 3 illustrate additional exemplary embodiments of the invention, wherein identical components as described above are identified by the same reference numbers.

In FIG. 2, the supplemental positioning piston control device 80 is detachably connected to the displacement volume control device 60. A contact surface 90 is located between the extensible piston rod of the supplemental positioning piston device 80 and the displacement volume control device 60.

The supplemental positioning piston device 80 is actuated by a spring device 91, such as a compression spring, which holds the supplemental positioning piston device 80 in contact against the displacement volume control device 60. In the illustrated exemplary embodiment, the spring device 91 is located in the control pressure compartment 81 of the supplemental positioning piston device 80.

In FIGS. 1 and 2, the supplemental positioning piston device 80 is located separately from the positioning piston device 61.

In FIG. 3, the supplemental positioning piston device 80 is located in an axial extension of the positioning piston device 61, and is in an operative connection with the positioning piston device 61. The supplemental positioning piston device 80 is preferably coaxial with the positioning piston device 61. The extensible piston rod of the supplemental positioning piston device 80 extends into the control pressure compartment 61a and acts on the positioning piston of the positioning piston device 61. A centering device 95 for the piston rod of the supplemental positioning piston device 80 can be created in the positioning piston of the positioning piston device 61. The additional positioning piston device 80 can alternatively be formed by a plurality of supplemental positioning pistons, for example two or more supplemental pistons located on an arc, which act on the positioning piston device 61.

To ensure contact between the supplemental positioning piston device 80 and the positioning piston of the positioning piston device 61, the extensible piston rod of the supplemental positioning piston device 80, as illustrated in FIG. 1, can be non-detachably fastened to the positioning piston of the positioning piston device 61 by interlocking connection means. Alternatively, the extensible piston rod of the supplemental positioning piston device 80, as illustrated in FIG. 2, can be in detachable contact with the positioning piston of the positioning piston device 61 and a compression spring can be provided which holds the piston rod of the supplemental positioning piston device 80 in contact with the positioning piston of the positioning piston device 61.

To start the shutoff internal combustion engine 3 by operating the power unit 2 as a motor, the control device 42 actuates the control valve 40 into the open position 40b so that the control valve 40 connects the suction side S of the power unit 2 with the hydraulic accumulator 30 and the supplemental positioning piston device 80 with the hydraulic accumulator 30. The control valve 40, which connects the suction side S of the power unit 2 with the hydraulic accumulator 30 for operation as a motor, thereby simultaneously routes the pressure of the hydraulic accumulator 30 to the control pressure compartment 81 of the supplemental positioning piston device 80. Consequently, the supplemental positioning piston device 80 adjusts the displacement volume control device 60 of the power unit 2 to the terminal stop 70 for maximum displacement volume. As soon as the torque of the power unit 2 operated as a motor resulting from the pressure of the hydraulic accumulator 30 on the suction side S of the power unit 2 and the position of the displacement volume control device 60 exceeds the drag moment and breakaway moment on the output shaft 7 of the internal combustion engine 3, the internal combustion engine 3 starts.

On account of the small piston surface 83 of the supplemental positioning piston device 80, there is a brief reaction time for the adjustment of the displacement volume control device 60 to the maximum displacement volume, so that a short and fast startup can be achieved by operating the power unit 2 as a motor. In addition, for actuation of the displacement volume control device 60 to the maximum displacement volume of the supplemental positioning piston device 80, only a small quantity of hydraulic fluid is extracted from the hydraulic accumulator 30 so that the pressure level in the hydraulic accumulator 30 decreases only slightly and, therefore, a high torque can be generated by the power unit 2 operated as a motor for an effective startup of the internal combustion engine 3.

In FIGS. 1 to 3, throttling means 105, such as a nozzle or throttle, for example, which can also be present and which influence the speed of response of the displacement volume control device 60, are shown, which are located in the hydraulic line 82 leading to the supplemental positioning piston control device 80, and with which the speed of response of the displacement volume control device 60 can be influenced and limited on the occasion of a pressurization of the supplemental positioning piston device 80. When the displacement volume control device 60 of the power unit 2 is adjusted to the terminal stop 70 during a pressurization of the supplemental positioning piston device 80 with hydraulic fluid from the hydraulic accumulator 30, the throttling means 105 can limit the speed of response of the displacement volume control device 60 to prevent damage to the terminal stop 70 or the displacement volume control device 60.

Because in the power unit 2 of the invention no additional pressure reducing valves or check valves are necessary as with a supply of the control device 60 with a charge pressure level generated from the hydraulic accumulator 30, the result is reduced construction effort and expense and a reduction in the amount of space required for a valve block 100 in which the valves (control valve 40, charging valve device 33 and, optionally, the pressure reducing valve 35) necessary for the operation of the power unit 2 as a motor are located.

The invention is not limited to the exemplary embodiments illustrated. The power unit 2 claimed by the invention can also be used as a hydraulic starter for an internal combustion engine in vehicles that do not have working hydraulics. The power unit 2 then functions only as a pump to charge the hydraulic accumulator 30.

The drive connection of the power unit 2 with the internal combustion engine 3, as illustrated in the accompanying figures, can be coaxial with the output shaft 7 formed by the crankshaft of the internal combustion engine 3. Alternatively, the power unit 2 can be in a drive connection with the internal combustion engine 3 as an auxiliary drive by a transmission device, such as a spur gear transmission, a belt transmission, or a chain transmission, or, alternatively, it can act on an existing auxiliary drive of the internal combustion engine 3.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A hydrostatic power unit arrangement, comprising:
a variable displacement machine with a continuously variable displacement volume and operable as a pump and motor;
an internal combustion engine connected to the variable displacement machine, wherein when operated as a pump, a suction side of the variable displacement machine sucks hydraulic fluid out of a tank and delivers into a delivery side, wherein when operated as a motor, the variable displacement machine is a hydraulic starter to start the internal combustion engine, and wherein the variable displacement machine operated as a motor is supplied with hydraulic fluid from a hydraulic accumulator on the suction side;
a displacement volume control device to set a displacement volume of the variable displacement machine;
a positioning piston device supplied with hydraulic fluid from a charging pressure circuit; and
a supplemental positioning piston device in operative connection with the displacement volume control device for adjustment of the displacement volume of the variable displacement machine and which is actuated directly by the pressure present in the hydraulic accumulator, wherein the variable displacement machine is adjusted to increase the displacement volume to start the internal combustion engine by a connection of the supplemental positioning piston device with the hydraulic accumulator.

2. The hydrostatic power unit arrangement as recited in claim 1, wherein a pressurized piston surface of the supplemental positioning piston device is smaller than a pressurized piston surface of the positioning piston device.

3. The hydrostatic power unit arrangement as recited in claim 1, wherein the variable displacement machine is a unilaterally variable displacement power unit, and the displacement volume control device of the variable displacement machine is displaceable in one direction by the positioning piston device and the supplemental positioning piston device starting from a position with a minimum displacement volume.

4. The hydrostatic power unit arrangement as recited in claim 1, wherein the supplemental positioning piston device, when in communication with the hydraulic accumulator, moves the displacement volume control device to a terminal stop with a maximum displacement volume.

5. The hydrostatic power unit arrangement as recited in claim 1, including a control valve for control of the connection of the hydraulic accumulator with the suction side of the variable displacement machine, wherein the control valve controls the connection of the supplemental positioning piston device with the hydraulic accumulator.

6. The hydrostatic power unit arrangement as recited in claim 5, wherein for a startup of the shutoff internal combustion engine by the control valve, the suction side of the variable displacement machine is connected with the hydraulic accumulator and the supplemental positioning piston device is connected with the hydraulic accumulator.

7. The hydrostatic power unit arrangement as recited in claim 5, wherein the hydraulic accumulator is in communication with the suction side of the variable displacement machine by a connecting line in which the control valve is located, and wherein a hydraulic line to pressurize the supplemental positioning piston device with hydraulic fluid from the hydraulic accumulator is connected with the connecting line downstream of the control valve.

8. The hydrostatic power unit arrangement as recited in claim 7, wherein in the hydraulic line leading to the supplemental positioning piston device, there are throttling means that influence the speed of response of the displacement volume control device.

9. The hydrostatic power unit arrangement as recited in claim 1, wherein the supplemental positioning piston device is in operative connection with the positioning piston device, which is in an operative connection with the displacement volume control device, or the displacement volume control device, or with an actuator and control valve arrangement that actuates the displacement volume control device.

10. The hydrostatic power unit arrangement as recited in claim 9, wherein the supplemental positioning piston device is non-detachably connected with the positioning piston device or the displacement volume control device or the actuator and control valve arrangement by interlocking connection means.

11. The hydrostatic power unit arrangement as recited in claim 10, wherein the interlocking connection means comprises an articulated connection selected from a ball-and-socket joint and a pivot.

12. The hydrostatic power unit arrangement as recited in claim 9, wherein the supplemental positioning piston device is detachably connected with the positioning piston device or the displacement volume control device or the actuator and control valve arrangement.

13. The hydrostatic power unit arrangement as recited in claim 12, wherein the supplemental positioning piston device is actuated by a spring device which holds the supplemental positioning piston device in contact with the positioning piston device or the displacement volume control device or the actuator and control valve arrangement.

14. The hydrostatic power unit arrangement as recited in claim 1, wherein the supplemental positioning piston device is located in an axial extension of the positioning piston device and is in an operative connection with the positioning piston device.

15. The hydrostatic power unit arrangement as recited in claim 1, wherein the displacement volume control device is actuated by a spring device toward a minimum displacement volume.

16. The hydrostatic power unit arrangement as recited in claim 1, wherein the variable displacement machine is an axial piston machine having a swashplate construction.

17. A drivetrain of a vehicle, comprising a hydrostatic power unit arrangement, as recited in claim 1, driven by the internal combustion engine.

18. The drivetrain as recited in claim 17, wherein the power unit arrangement when operated as a motor is a hydraulic booster drive.

19. The drivetrain as recited in claim 17, wherein the vehicle has working hydraulics and the power unit arrangement, when operated as a pump, supplies the working hydraulics of the vehicle with hydraulic fluid.

20. A vehicle with a drivetrain as recited in claim 17.

* * * * *

UNITED STATES PATENT AND TRADEMARK OFFICE
CERTIFICATE OF CORRECTION

PATENT NO. : 9,664,168 B2  
APPLICATION NO. : 14/451747  
DATED : May 30, 2017  
INVENTOR(S) : Lukas Krittian et al.

Page 1 of 1

It is certified that error appears in the above-identified patent and that said Letters Patent is hereby corrected as shown below:

On the Title Page

Column 1, Item (30) Foreign Application Priority Data, Line 1, delete "Aug. 23, 2013" and insert
-- Aug. 22, 2013 --

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*